O. A. KENYON.
Wagon Lock.
No. 74,831.
Patented Feb. 25, 1868.
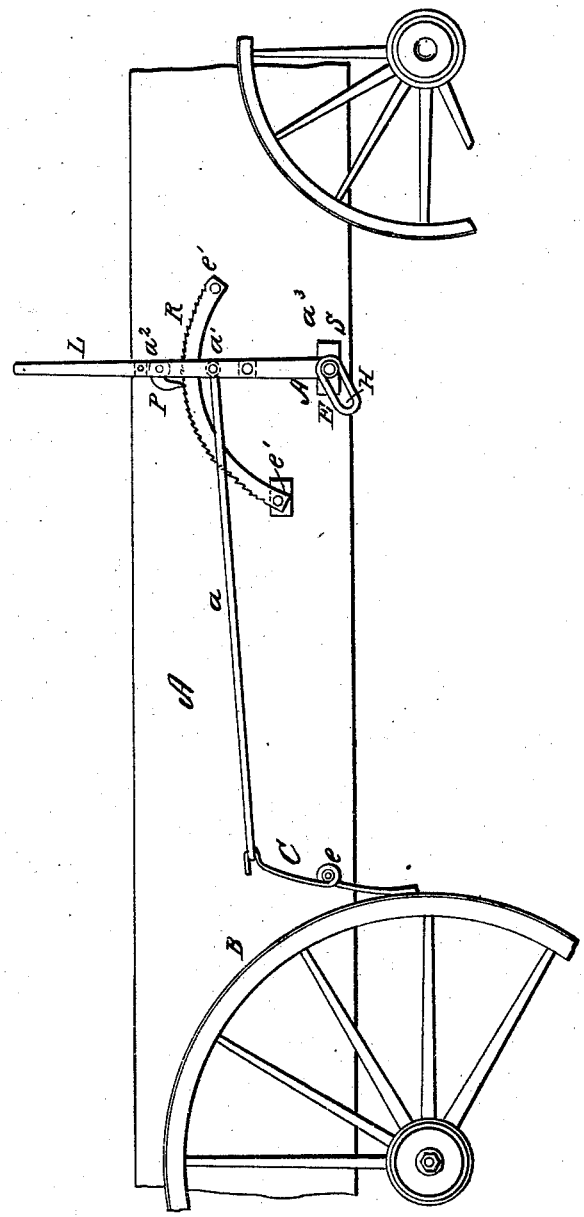
Witnesses.
W. C. Ashkettle
Theo. Frische
Inventor:
O. A. Kenyon,
per
Munn & Co.
Attorneys.

United States Patent Office.

O. A. KENYON, OF McGREGOR, IOWA.

Letters Patent No. 74,831, dated February 25, 1868.

---

IMPROVEMENT IN WAGON-LOCK.

---

*The Schedule referred to in these Letters Patent and making part of the same.*

---

TO ALL WHOM IT MAY CONCERN:

Be it known that I, O. A. KENYON, of McGregor, in the county of Clayton, and State of Iowa, have invented a new and improved Wagon-Lock; and I do hereby declare that the following is a full, clear, and exact description thereof, which will enable others skilled in the art to make and use the same, reference being had to the accompanying drawings, forming part of this specification.

This invention relates to a new and improved method of constructing wagon-locks, by means of which the brake is more firmly held against the wheel, and whereby, also, the pressure of the same is more quickly and easily taken off.

It consists of a pawl, pivoted in a slot in the lever, by means of which the brake is operated, engaging in the teeth of a metallic segment so as to hold the brake firmly against the wheel after the hand of the operator has been removed.

It consists also of the lever being bent at the lower end, and provided therein with a slot in which the pivot on which said lever turns may move, so that by the reverse motion of the lever, the slot in the bent end of the lever will slide over the pivot, and the pressure of the brake upon the wheel will be relieved.

The drawing is a side view of a wagon with my invention attached.

A is the wagon; B is the hind wheel; C is a brake, secured to wagon A by pivot $e$; L is a lever, by means of which brake C is operated; $a$ is a connecting-rod, connecting brake C to lever L; P is a pawl, pivoted to lever L; R is a toothed segment, secured to wagon A by screws $e'$; $a^2$ is a pivot, on which pawl P turns; F is the short or bent arm of lever L; H is a slot in arm F of lever L; $a^3$ is the pivot on which lever L turns; S are screws securing the plate A' to the wagon A; A' is a plate secured to wagon A, to which pivot $a^3$ is secured. At any convenient place on the wagon A, near the bottom and front end of the same, as shown, is secured by screws S in the ordinary way, a plate, A', said plate A' being provided with a start or pivot, $a^3$, rigidly secured to said plate so as to stand at right angles to the side of the wagon A, when the said plate A' is secured to said wagon A. The lever L is a bent lever, provided with a slot, H, through the shorter or bent end F of the same, as shown in the drawing, to receive the pivot $a^3$, and so as to slide upon said pivot $a^3$. Through the lever L, and near the middle of the same, is a slot to receive the pawl P, which is pivoted to said lever in said slot in the same by a pivot, $a^2$. Upon the wagon A is secured, by any suitable screws, $e'$, a metallic toothed segment, R, so situated, as shown in the drawing, that the pawl P will engage in the teeth of the same, so as to hold the lever L in any desired position in the forward or backward movement of the same. The shorter arm F of the lever L is bent so as to form any required angle with the longer arm of the same, and said arm F is provided with a slot, H, through the whole length of the same, so as to receive and slide upon the pivot $a^3$, so that in the forward motion of the longer arm of the lever L the pivot $a^3$ will be a fulcrum upon which said lever L turns; and in reverse motion of the longer arm of the lever L, the shorter arm F will slide over the pivot $a^3$, and the pawl P will be disengaged from the teeth of the segment R. To the lever L, and below the pivot $a^2$ of the pawl P, and pivoted thereto at one end by the pivot $a^1$, is the connecting-rod $a$. To the wagon A, and just forward of the hind wheel B, and pivoted to said wagon by the pivot $e$, so as that one arm of the same may be forced against the circumference or tire of the hind wheel B, is a brake, C. Said brake C may be of any convenient shape, having a spring wound around the pivot $e$ in such a way as that the pressure of the brake may be against the pressure of said spring, or in any other convenient way, the upper end of the same being provided with a hook or pivot, to which the other end of the connecting-rod $a$ is attached, as shown in the drawing, in such a way that, by the forward movement of the longer arm of the lever L, the lower arm of the brake C will be forced against the tire of the wheel B, and the pawl P will drop into one of the teeth of the segment R, thereby holding said brake C firmly against said tire. By the reverse operation of said lever L, the arm F will slide over the pivot $a^3$, thereby disengaging the pawl P from the segment R, and relieving the pressure of the brake C from the tire of the wheel B, leaving the said wheel B free to turn upon the axle of the same.

The apparatus may be made of iron, or of other suitable metal, or of wood and metal combined.

The operation is readily seen from the drawing and the above description. Constructed as above described, it constitutes a safe and reliable wagon-lock, the advantages of which are that the same is more easily operated than the wagon-lock now commonly in use, and the pressure of the brake upon a wagon-wheel more easily regulated or entirely removed.

I claim as new, and desire to secure by Letters Patent—

The slotted arm F of the lever L, in combination with the pivot $a^3$, pawl P, segment R, connecting-rod $a$, and pivoted brake C, as herein described, for the purpose specified.

O. A. KENYON.

Witnesses:
E. P. HALL,
W. R. KINNAIRD.